United States Patent Office 3,034,758
Patented May 15, 1962

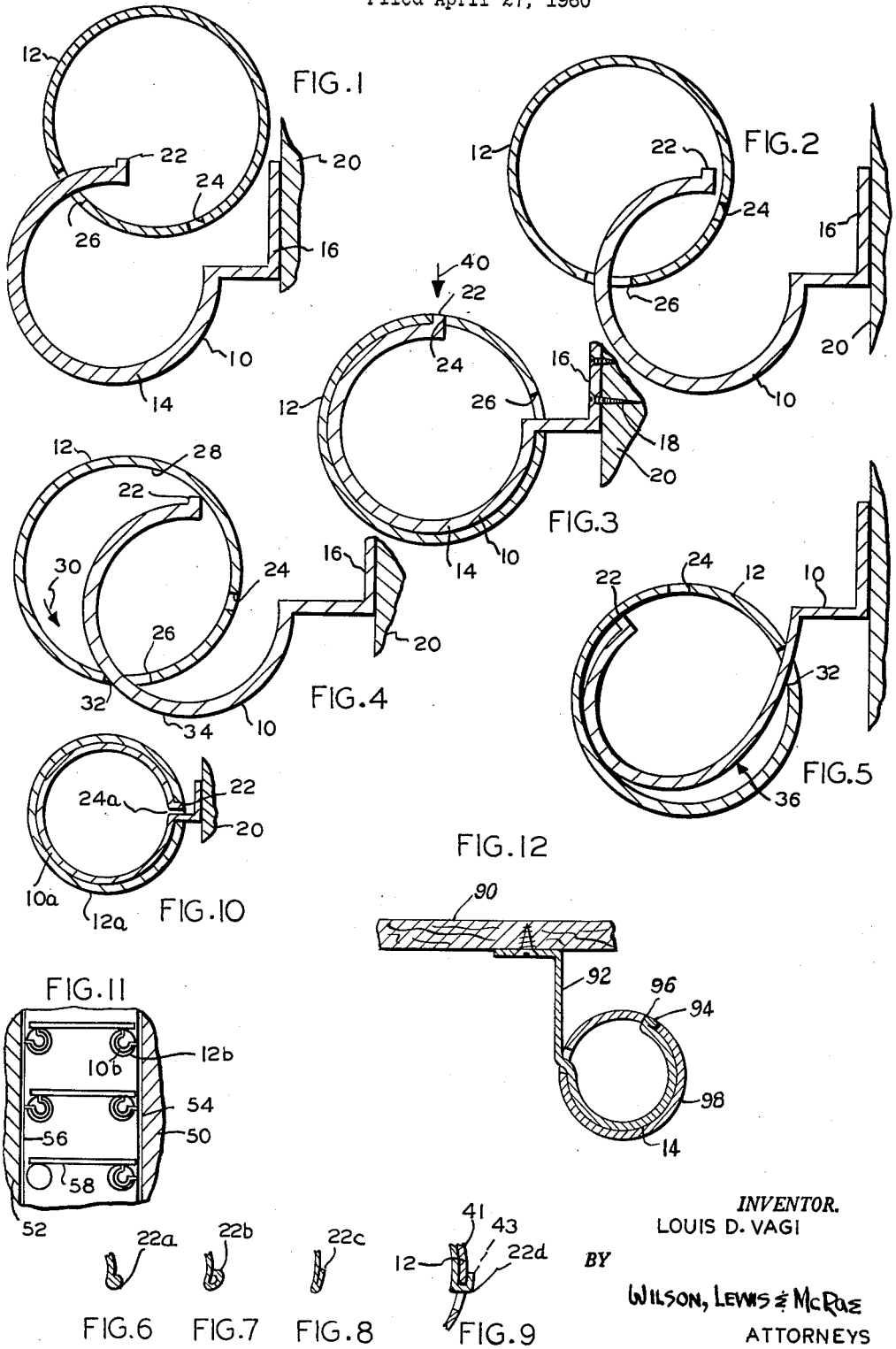

3,034,758
CONNECTOR
Louis D. Vagi, 420 Sunningdale Drive, Inkster, Mich.
Filed Apr. 27, 1960, Ser. No. 25,146
8 Claims. (Cl. 248—251)

This invention relates to a connector mechanism, as for example a connector adapted to connect such tubular items as curtain rods, vacuum cleaner wands, guide rails, porch rails, stair rails, display racks, and other similar products onto adjacent structures such as mounting mechanisms, building walls, shelves or other supporting mechanisms with which the above-identified devices might be utilized.

Numerous arrangements have been proposed for attaching tubular items to each other and to supporting structures. However in many cases the supporting and connecting mechanisms have been of a relatively complex and expensive nature. Such devices have in general been of advantage in service, yet for many installations the prior art connector devices have left much to be desired, particularly as regards simplicity and economy of installation and removal, positive locking of the connected devices, and compatibility with a wide range of materials and applications.

With the above general discussion in view, it is one object of the present invention to provide a connector arrangement having improved features of simplicity of construction, positive locking, and ease of assembly and removal.

A further object of the invention is to provide a more effective as well as novel connector arrangement which has applicability in a greater diversity of applications.

A further object of the invention is to provide a connector arrangement which can be incorporated with a wide variety of materials, such as aluminum, plastics and steel.

In connection with the above-mentioned object, it is a further object to provide a connector arrangement which can be utilized with conventional as well as heretofore unutilized materials so as to enjoy such desirable benefits as weight reduction, permanent and improved finishes, corrosion resistance, ease of fabrication, ease of coloring, light transmission, and light diffusion advantages.

A further object of the invention is to provide a more broadly usable connector arrangement having an internal connection with the device to be supported thereby, such that extensive external surfaces of the supported device are relatively freed of obstructions. This characteristic is of particular advantage in such installations as the mounting of hand rails, curtain rods, and guide rails of various kinds, since in such installations a smooth obstruction-free surface is essential to proper guiding and traversing of the cooperating components.

Other objects of this invention will become apparent in the following description and appended claims, reference being had to the accompanying drawings forming a part of this specification wherein like reference characters designate corresponding parts in the several views.

In the drawings:

FIGURE 1 is a sectional view through one embodiment of the invention, taken with the components thereof in a substantially completely disassembled condition;

FIGURE 2 is a sectional view in the direction of FIGURE 1 but showing the components in a partially assembled position;

FIGURE 3 is a sectional view in the direction of FIGURE 1 but showing the components in the completely assembled condition;

FIGURE 4 is a sectional view in the direction of FIGURE 1 but showing the components rotationally advanced from the condition of FIGURE 2;

FIGURE 5 is a sectional view in the direction of FIGURE 1 but showing the components in a position of assembly intermediate the FIGURE 4 and FIGURE 3 positions;

FIGURE 6 is a sectional view showing a detent configuration which can be employed in lieu of the detent configuration shown in FIGURES 1-5;

FIGURE 7 is a sectional view showing another detent configuration which can be employed in lieu of the detent configuration shown in FIGURES 1-5;

FIGURE 8 is a sectional view showing still another detent configuration which can be employed in lieu of the detent construction shown in FIGURES 1-5;

FIGURE 9 is a sectional view showing a still further detent configuration which can be employed in lieu of the FIGURES 1-5 detent construction;

FIGURE 10 is a sectional view taken in the same direction as FIGURE 3 but showing an embodiment of the invention which utilizes a tubular rail having a single mounting slot therein in place of the two slots employed in the FIGURE 3 arrangement;

FIGURE 11 is a view on a reduced scale showing closet shelves supported from devices constructed similarly to the FIGURES 1-5 device; and FIGURE 12 is a sectional view illustrating another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly FIGURE 3, there is shown an assembly including a mounting bracket 10 and an elongated tube or rail 12. The mounting bracket as shown in FIG. 3 of the drawings is provided with a generally cylindrical or arcuate section 14, and a support section 16 having screws 18 projecting therethrough to support it on the building wall 20.

The construction shown in FIG. 3 has particular application as a device for mounting a stair hand rail, and it will be appreciated that tube 12 can therefore have a length necessary for such an application. The number of mounting brackets 10 will of course be determined by the length of rail 12 and the amount of support which it is desired to give thereto, but in any event there will be at least two of the mounting brackets 10 employed in the usual hand rail mounting arrangement.

It will be noted from FIG. 3 that the mounting bracket is provided with a turned end portion 22, hereinafter referred to as a detent. This detent seats snugly within a detent-reception opening 24 formed in the rail 12. A second opening 26 is provided in rail 12 to permit insertion of the connector into the rail. This opening defines two axially facing edge surfaces and two circumferentially facing edge surfaces. The arrangement is such that the axially facing edge surfaces prevent axial displacement of the tubular rail on the bracket.

The installation procedure is initiated by insertion of the rail onto the mounting bracket as shown in FIG. 1. Thus, the workman merely positions the rail over the mounting bracket, with the opening 26 thereof slipping over detent 22. As the rail 12 is further introduced onto the mounting bracket it assumes the position of FIG. 2 and then the position of FIG. 4. In the FIG. 4 position the detent 22 engages the inner surface 28 of the rail so that the rail must be rotated relative to the bracket in order to move the rail from the FIG. 4 position toward the FIG. 5 position.

The installation procedure is accomplished by moving the rail in the arrow 30 direction relative to the mounting bracket as shown in FIG. 4. As this arrow 30 movement progresses the shoulder 32 formed by opening 26 rides along the convex surface 34 of the mounting bracket so that the mounting bracket is compressed to a certain extent as denoted by the arrow 36 in FIG. 5.

After the rail reaches its FIG. 5 position further movement thereof in the arrow 30 direction causes the detent-receiving opening 24 to be moved toward the detent 22, and accordingly at a predetermined point the resiliency of the bracket 10 material causes detent 22 to be engaged into opening 24. At this position the surface 36 of the mounting bracket may engage the shoulder 32 so as to cooperate with detent 22 in locking the hand rail in its FIG. 3 position.

It will be seen from FIG. 3 that in the installed position of the rail the detent 22 acts to prevent lateral movement or rotation of the rail relative to the mounting bracket. However the rail may be disconnected from the mounting bracket by applying pressure to the detent 22 in the arrow 40 direction.

It will be noted from FIG. 3 that since the mounting structure engages the rail 12 on its inner surface, the outer surface of the rail is left substantially unobstructed. The arrangement is therefore of particular advantage in that personnel can grasp a hand rail thus mounted and slide their hands along its external surface without encountering obstructions or hindrances.

FIG. 3 has been explained in connection with rail 12 as useful for a hand rail adjacent a building stairway. However, the same general arrangement can be employed with other rail constructions, such as guide rails for conveyors or overhead devices, curtain rod installations, drapery rods, and other similar guide-slide arrangements.

Because of the internal hidden character of the mount construction, the FIG. 3 arrangement has an ornamental streamlined appearance which favors it for such applications as towel rods, porch rail constructions, and ornamental slat structures such as are sometimes used as building partition walls.

The "ease of installation" feature is of course enhanced by reason of the fact that the mounting bracket can be easily secured in place apart from the rail, and the rail quickly applied after the mounting bracket is located in its designated space; or conversely, the connectors can be inserted into the rail and the assembly then fastened in place as required.

FIG. 3 shows the detent 22 as economically formed by a turning of the end portion of the mounting bracket. FIGS. 6 through 9 show different forms which the detent may take. Thus in FIG. 6 the detent is formed as a cylindrically surfaced projection 22a. The cylindrical configuration is of some advantage in that it permits the rail to easily slide thereon during the installation and removal operations.

FIG. 7 shows the detent as formed by a curled rebent portion 22b.

FIG. 8 shows the detent as formed by a portion 22c rebent one hundred eighty degrees relative to the general plane of the adjacent surface of the bracket. This arrangement gives somewhat greater strength to the detent than is obtained with the FIG. 3 arrangement.

FIG. 9 shows the detent as including an end portion 22d extending outwardly from the general external surface 41 of the rail 12, the purpose of projecting portion 22d being to form an auxiliary lock construction, as by turning the projecting portion back for locking against surface 41 as indicated by the dotted lines at 43.

The construction shown in FIG. 3 utilizes a plurality of openings 24 and 26 in the rail 12. However, it is possible under the present invention to utilize a construction having but a single opening, as shown in FIG. 10. In the FIG. 10 arrangement there is provided a rail 12a having a single opening 24a therein. The mounting bracket 10a is initially formed as shown in FIG. 10, and is inserted into the rail by having its detent portion 22 initially projecting through the opening 24a and then rotating the rail on the mounting bracket in the same general manner as was explained in connection with FIGS. 4 and 5. The installation procedure is substantially the same as in connection with the FIG. 3 arrangement except that the mounting bracket undergoes a somewhat greater compression during the installation operation.

Referring to FIG. 11, there is shown an arrangement including two opposed building walls 50 and 52, to which are secured vertically extending strips 54 and 56. Each of the strips has stamped therein a series of sections which are shaped to provide series of mounting brackets 10b. Each of the mounting brackets is of the same general contour as the previously discussed mounting bracket 10, and each mounting bracket supports a rail 12b, the various rails being constructed similarly to the rail 12 shown in FIG. 3.

It will be seen from FIG. 11 that the rail arrangement is such that those rails located opposite one another on the walls 50 and 52 are adapted to support a shelf 58 therebetween. It will be appreciated that the shelf-supporting elements may be utilized in various different installations, such as linen closets, coat closets, kitchen cabinets, stock parts cabinets, library shelves, etc. It is further contemplated that if desired the shelves 58 can be slidably mounted on the tubes or rails 12, it being noted in this connection that the upper surfaces and side surfaces of the rails are free of any obstructions such as would prevent their use as guide rails.

FIG. 12 illustrates an arrangement wherein a conventional clothes closet shelf 90 is utilized to support a pair of connector brackets 92, only one of which is visible in the figure. Each bracket is provided with an arcuate semi-flexible section 14 and a detent 94. The arrangement is such that in its installed position the detent is snapped into an opening 96, in the elongated tubular clothes pole 98. It will be understood that tubular pole 98 may extend completely or partially across the closet, and that the pole and connector brackets 92 are assembled together in the same manner as the corresponding structures shown in FIG. 3.

In manufacture of the above-described constructions shown in FIGS. 1 through 12 various materials such as steels, aluminum and a wide variety of plastics may be utilized. Due to the design of the cooperating parts and the manner in which they cooperate it is possible to construct the parts as relatively large diameter devices or as relatively small diameter devices. As a result the invention has application in a wide variety of fields.

The above description has necessarily been restricted to a discussion of specific embodiments and applications. However, it will be appreciated that the invention can be utilized in various modified forms, and that certain changes in construction and arrangement can be resorted to without departing from the spirit of the invention as set forth in the appended claims.

I claim:
1. The combination comprising a pair of mounting brackets; each bracket including a wall-engaging part, an arm extending from said wall-engaging part, and an arcuately extending resilient section projecting from said arm; a portion of said arcuate section being turned outwardly to define a detent; an elongated tubular element spanning the space between said brackets and having apertures therein; said mounting brackets extending into the tubular element with the arcuate sections thereof lying snugly against the inner surfaces of the element, and with the detents thereof extending through the apertures whereby to lock the tubular element in position on the mounting brackets.

2. A connector construction comprising a hollow member having an opening in its side surface defining two axially facing edge surfaces and two circumferentially facing edge surfaces; a second member having an arm portion extending through said opening and having an arcuate resilient portion snugly engaging against the inner surface of said member, said arcuate resilient portion extending from the arm portion for a substantial circumferential distance around the interior surface of said member so that the two members are locked against radial displacement relative to one another; said arm portion fitting against the axially facing edge surfaces of the opening in said member so as to cooperate therewith in preventing axial displacement of the two members relative to one another.

3. The combination of claim 2 and further comprising a detent carried by the resilient portion and engageable with a portion of said member to prevent rotation of said member relative to the second member.

4. The combination comprising a tubular member having an opening in its side surface defining two axially facing edge surfaces and two circumferentially facing edge surfaces; a bracket for mounting said tubular member on a support surface comprising a support surface-engageable base portion, an arm portion projecting from said base portion through the aforementioned opening in the tubular member, and an arcuate resilient portion fitting within the tubular member and extending from the arm portion for a substantial circumferential distance around the interior surface of the tubular member so that the tubular member is locked against radial shifting off of the bracket; said arm portion fitting against the axially facing edge surfaces formed by the aforementioned opening in the tubular member so as to cooperate therewith in preventing axial displacement of the tubular member relative to the bracket.

5. The combination of claim 4 wherein the arcuate resilient portion extends for at least two hundred seventy radial degrees from the arm portion to its termination point within the tubular member.

6. The combination of claim 4 wherein the tubular member is provided with a second opening spaced from the first opening but approximately in the same radial plane thereas; the combination further comprising a detent carried on said arcuate resilient portion and engaged in said second opening to prevent rotational movement of the tubular member on the bracket.

7. The combination of claim 4 wherein the arcuate resilient portion extends for a circumferential distance of approximately three hundred sixty radial degrees from the arm portion; the combination further comprising a detent carried on said arcuate resilient portion and engaged in a portion of the aforementioned opening not occupied by the arm portion to prevent rotational movement of the tubular member on the bracket.

8. In combination, a mounting bracket, said bracket including an arm, a generally arcuate resilient section projecting from said arm, a portion of said arcuate section being turned outwardly to define a detent, an elongated element having a hollow interior with an aperture therein, said mounting bracket extending into said hollow interior with said generally arcuate resilient section thereof engaging at least a portion of the inner surface of said elongated element, and said detent engaging said aperture, whereby said elongated element is locked in position on said mounting bracket.

References Cited in the file of this patent

UNITED STATES PATENTS

| | | |
|---|---|---|
| 1,376,330 | Gibson | Apr. 26, 1921 |
| 1,553,132 | Bertrand | Sept. 8, 1925 |
| 1,661,674 | Osborn | Mar. 6, 1928 |
| 1,707,230 | Lowy | Apr. 2, 1929 |
| 2,866,997 | Eskridge | Jan. 6, 1959 |
| 2,932,056 | Crosswell | Apr. 12, 1960 |